United States Patent [19]

Samuelson et al.

[11] Patent Number: 5,260,004
[45] Date of Patent: Nov. 9, 1993

[54] PROCESS OF MAKING LANGMUIR-BLODGETT FILMS HAVING PHOTO-ELECTRONIC PROPERTIES

[75] Inventors: Lynne A. Samuelson, West Newton; David L. Kaplan, Stow, both of Mass.; Kenneth A. Marx, Francestown, N.H.; Sukant K. Tripathy, Acton; Jayant Kumar, Lowell, both of Mass.

[73] Assignees: The United States of America as represented by the Secretary of the Army, Washington, D.C.; University of Massachusetts Lowell, Lowell, Mass.

[21] Appl. No.: 802,675
[22] Filed: Dec. 2, 1991
[51] Int. Cl.$^5$ .................. B29C 41/02; B29C 71/02; B29C 71/04
[52] U.S. Cl. ..................... 264/22; 264/104; 264/236; 264/298; 427/74; 427/508; 427/521
[58] Field of Search .......... 264/22, 104, 236, 298; 427/74, 508, 521

[56] References Cited

U.S. PATENT DOCUMENTS

| | | | |
|---|---|---|---|
| 4,539,061 | 9/1985 | Sagiv | 156/278 |
| 4,542,104 | 9/1985 | Stryer et al. | 436/536 |
| 4,632,800 | 12/1986 | Barraud et al. | 264/298 |
| 4,666,862 | 5/1987 | Chan | 436/501 |
| 4,672,265 | 6/1987 | Eguchi et al. | 313/504 |
| 4,732,783 | 3/1988 | Choe et al. | 427/164 |
| 4,796,981 | 1/1989 | Nishimura et al. | |
| 4,857,474 | 8/1989 | Waterbury et al. | 436/501 |
| 4,871,236 | 10/1989 | Gemma et al. | |
| 4,946,629 | 8/1990 | Allen et al. | 252/589 |
| 4,960,635 | 10/1990 | Erdelen et al. | 264/298 X |
| 4,965,020 | 10/1990 | Allen et al. | 252/587 |
| 4,973,429 | 5/1990 | Decher et al. | 252/587 |
| 4,981,612 | 1/1991 | Allen et al. | 252/583 |
| 4,987,219 | 1/1991 | Uekita et al. | 528/353 |
| 5,002,707 | 3/1991 | Ogawa et al. | 264/22 |

OTHER PUBLICATIONS

Samuelson et al., "Oriented fluorescent streptavadin conjugated phycoerthrin protein on biotinylated lipid LB monolayer films", *Proteins*, pp. 160-164, ESCOM Science Publishers B.V., The Netherlands, 1991.
Sauelson et al., "Streptavadin–Phycoerthrin Conjugated Proteins Bound To Biotin On Langmuir-Blodgett Films Of Biotinylated Lipid Monolayers", *Materials Research Society Symposium Proceedings*, vol. 218, pp. 157-162, Aug. 1991.
M. Ahlers et al., Thin Solid Films, vol. 180, pp. 93-99 (1989).
L. Samuelson et al., abstract entitled "Oriented Fluorescent Streptavidin–Phycoerythrin Conjugated Protein Monolayers on Biotin Lipid LB Monolayer Films," distributed at Expanding Frontiers in Polypeptide and Protein Structural Research proceedings, Whistler, B. C. Jul. 23, 1990.
L. Samuelson et al., "The Monomolecular Organization of a Photodynamic Protein System Through Specific Surface Recognition of Streptavidin to Biotinylated LB Films," Proteins–Structure/Dynamics/Design meeting proceedings, ESCOM Science Publishers B. V., Ju. 1991.
T. Sano et al., abstract P8.84, Abstract Book, 10th Int'l Biophysics Congress, Vancourver, B.C., Aug. 1990.

*Primary Examiner*—Leo B. Tentoni
*Attorney, Agent, or Firm*—Richard J. Donahue

[57] ABSTRACT

Langmuir-Blodgett films having photo-electronic properties and methods of making the same. The instant films may be made, for example, by spreading a mixture of one or more types of biotinylated lipids and one or more types of electrically-conductive lipids over a water-miscible liquid subphase. Conjugated molecules comprising a biotin-binding component made up of an avidin or streptavidin molecule or a fragment or derivative thereof having biotin-binding activity and a photodynamic proteinaceous component are then injected into the subphase. Because of the affinity between biotin and the biotin-binding component, the conjugated molecules bind to the biotinylated lipids. The air-subphase interface is then compressed, causing the biotinylated lipids and electrically-conductive lipids to form a monolayer thereat. In one embodiment, the biotin-binding component has biotin-binding sites available on its underside which may be used to bind biotinylated derivatives of one or more different species of photodynamic proteinaceous components and/or to build up a multi-layered complex of biotin-binding molecules and functional proteinaceous components using biotinylated rigid or flexible couplers.

16 Claims, 8 Drawing Sheets

PROCESS OF MAKING LANGMUIR-BLODGETT FILMS HAVING PHOTO-ELECTRONIC PROPERTIES

The invention described herein may be manufactured, used and licensed by or for the Government for Governmental purposes without the payment to us of any royalty thereon.

BACKGROUND OF THE INVENTION

The present invention relates generally to the production of Langmuir-Blodgett films and more particularly to the production of Langmuir-Blodgett films having photo-electronic properties.

The Langmuir-Blodgett technique has been used for many years to form monolayer or monomolecular films. Generally speaking, the Langmuir-Blodgett technique involves filling an open basin with a liquid subphase typically comprising a quantity of water and/or a water-miscible solvent. A small number of molecules, each molecule typically having a hydrophilic head group and a hydrophobic tail, are then deposited at the air-subphase interface. The molecules orient themselves at the air-subphase interface so that the hydrophilic head groups are in contact with the subphase and the hydrophobic tails are projected into the air. Because only a small number of molecules are typically spread over the air-subphase interface, the molecules are initially separated far apart relative to one another. A movable barrier in the basin is then used to compress the air-subphase interface until the molecules disposed thereat arrange themselves in an ordered, two-dimensional lattice. This lattice, which takes the form of a monolayer film, is then typically removed from the basin by deposition on a desired substrate. Frequently, more than one monolayer is constructed in this manner, the monolayers being used to form a multi-layered laminate.

In "Specific Recognition and Formation of Two-Dimensional Streptavidin Domains in Monolayers: Applications to Molecular Devices," *Thin Solid Films*, Vol. 180, pp. 93-99 (1989), which is incorporated herein by reference, M. Ahlers et al. describe the formation of a biotinlipid-streptavidin system, which is shown to bind and self-organize spontaneously to give thin two-dimensional crystalline layers of functional proteins at lipid-water interfaces. The streptavidin used was statistically labelled with two molecules of fluorescein isothiocyanate per molecule of protein according to a standard labelling procedure. The authors propose that the two biotin binding sites on the underside of each streptavidin molecule can be used to build up multilayered complex structures through binding to biotinylated functional groups, enzymes, antibodies, and other proteins. The authors also propose that multilayers of streptavidin and multifunctional polymers can be formed via biotinylated rigid or flexible couplers.

In an abstract entitled "Oriented Fluorescent Streptavidin-Phycoerythrin Conjugated Protein Monolayers on Biotin Lipid LB Monolayer Films," which was distributed to attendees of the *Expanding Frontiers in Polypeptide and Protein Structural Research* proceedings held in Whistler, British Columbia on Jul. 23, 1990, and which is incorporated herein by reference, L. Samuelson et al. describe oriented monolayer films possessing well-behaved isotherms, which are formed from biotin derivatized lipids by Langmuir-Blodgett techniques. In particular, the authors discuss how both avidin and streptavidin phycoerythrin conjugates, in an aqueous subphase, were found to interact preferentially with biotinylated lipid monolayer films while at the air-water interface and how the films exposed their hydrophilic biotin containing head groups to the four biotin binding sites on avidin and streptavidin in the conjugated proteins to form lipid-protein complexes having the effective stability of covalent bonds.

SUMMARY OF THE INVENTION

The present invention is directed to Langmuir-Blodgett films having photo-electronic properties, which may be designed for use in creating biosensor and other similar devices. According to the teachings of the present invention, the films are made by spreading a mixture of one or more types of biotinylated lipid molecules and one or more types of electrically-conductive lipid molecules over a water-miscible liquid subphase. Conjugated molecules comprising a photodynamic proteinaceous component and a biotin-binding component, such as an avidin or streptavidin molecule or a fragment or derivative thereof having biotin-binding activity, are then injected into the subphase. Because of the affinity between biotin and the biotin-binding component, the conjugated molecules become bound to the biotinylated lipids. The air-subphase interface is then compressed, causing the biotinylated lipids and electrically-conductive lipids to form a monolayer thereat.

In one embodiment of the present invention, the photodynamic proteinaceous components of the conjugated molecules are derivatized with biotin and then bound to biotin-binding sites disposed on the undersides of biotin-binding components. As can readily be appreciated, this biotin-mediated binding mechanism can be extended to provide a "cassette" (i.e. modular) approach whereby various different substances are interchangeably bound to the biotin-binding component. In this way, one can design a Langmuir-Blodgett film having the functional properties one desires. For example, two or more photodynamic proteinaceous substances having different excitation spectra can be incorporated into the film in the proportions and/or locations desired. In addition, multiple layers of biotin-binding molecules and photodynamic proteinaceous components and/or other functional proteins may be built up using biotinylated flexible or rigid couplers.

Various objects, features and advantages of the present invention will be set forth in part in the description which follows, and in part will be obvious from the description or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In these drawings wherein like reference numerals represent like parts.

DETAILED DESCRIPTION OF PREFERRED EMBODIMENTS

As discussed above, the present invention is directed to Langmuir-Blodgett films possessing photo-electronic properties and to methods for making such films. The Langmuir-Blodgett films of the present invention typically include a first layer which is disposed at the air-subphase interface and which comprises a mixture of one or more types of biotinylated lipid molecules and one or more types of electrically-conductive lipid molecules, a second layer which is disposed in the subphase and which comprises biotin-binding molecules made of avidin, streptavidin, or a fragment or derivative thereof having biotin-binding activity, and a third layer which comprises photodynamic proteinaceous molecules which are bound to the undersides of the biotin-binding molecules. The first layer and the second layer are bound together by the affinity between the biotinylated lipid molecules of the first layer and the biotin-binding molecules of the second layer.

Figure 1:
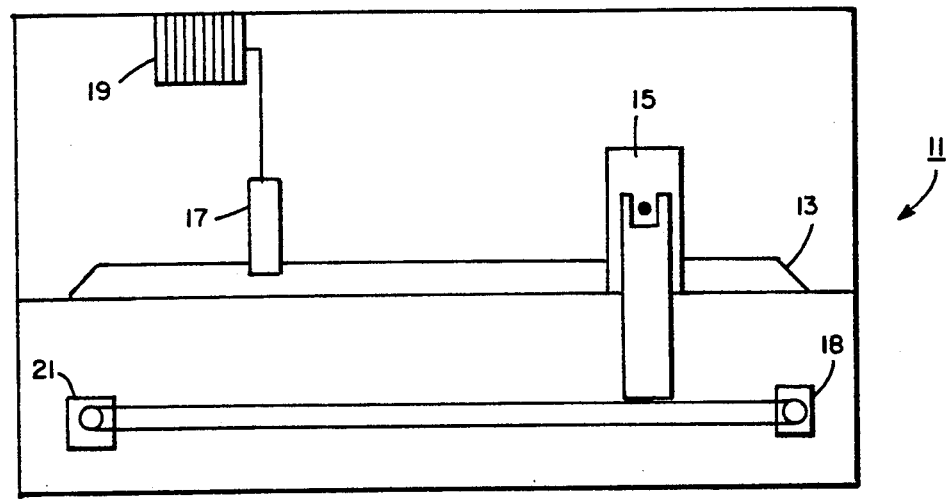
FIG. 1 is a schematic view of a conventional Langmuir trough, which may be used to practice the technique of the present invention.

Referring now to FIG. 1, there is illustrated a conventional Langmuir trough which may be used to practice the technique of the present invention, the Langmuir trough being represented generally by reference numeral 11.

As can be seen, trough 11 includes a basin 13, which is used to hold a solvent subphase (not shown). The solvent subphase typically includes water and/or a water-miscible solution, the precise composition of the subphase being largely dependent on the nature of the materials added thereto. Trough 11 also includes a pair of barriers 15 and 17, which are disposed in basin 13. Barrier 15, which is mechanically coupled to a motor 18, is used to compress the air-subphase interface of the solvent against barrier 17 so as to form a monolayer at the interface. A pressure sensor 19, which is used to monitor pressure at the air-subphase interface, is mounted on barrier 17. Trough 11 also includes a position encoder 21, which is used to monitor the location of barrier 15 as it moves towards barrier 17. The readings obtained by sensor 19 and position encoder 21 may be used to generate an isotherm.

Figure 2A:
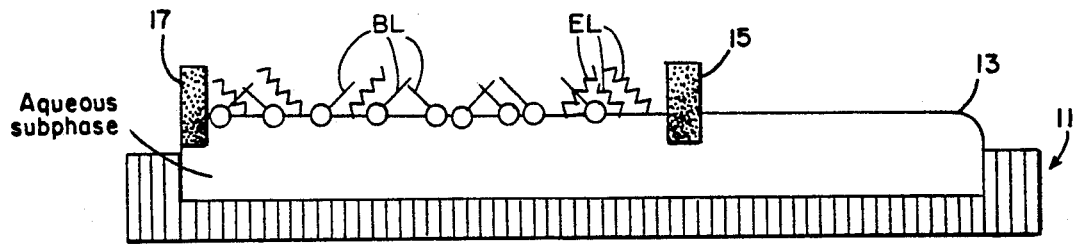
FIGS. 2(*a*) through 2(*c*) are schematic representations of one embodiment of a process for synthesizing a Langmuir-Blodgett film having photo-electronic properties in accordance with the teachings of the present invention.
Figure 2B:
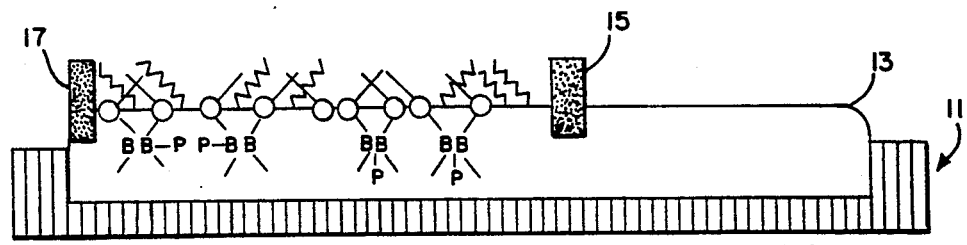
Figure 2C:
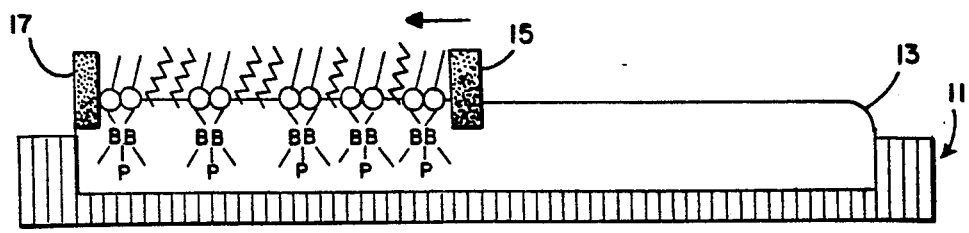

Referring now to FIGS. 2(a) through 2(c), the manner in which trough 11 may be used to make a Langmuir-Blodgett film having photo-electronic properties in accordance with one embodiment of the present invention is shown schematically. First, a mixture of one or more types of biotinylated lipid molecules BL and one or more types of electrically-conductive lipid molecules EL are spread over a water-miscible solvent subphase (see FIG. 2(a)). As can be seen, the molecules orient themselves at the air-subphase interface so that their hydrophobic tails are projected into the air. Next, as seen in FIG. 2(b), a plurality of conjugated molecules comprising a photodynamic proteinaceous component P and a biotin-binding component BB, such as an avidin or streptavidin molecule or a fragment or derivative thereof having biotin-binding activity, are injected into the subphase. Soon after their introduction into the subphase, the biotin-binding components bind to the biotinylated lipid molecules at the air-subphase interface. However, because many of the biotin-binding molecules have multiple biotin binding sites, the conjugated molecules tend to orient themselves relative to the biotinylated lipids in a variety of ways, depending on which of the binding sites is used to bind to the biotinylated lipids molecules. As seen in FIG. 2(c), as barrier 15 is used to compress the air-subphase interface so as to form a monolayer thereat, the conjugated molecules are forced to align themselves uniformly relative to the biotin-containing monolayer so that, in the case where the biotin-binding molecules have four biotin binding sites, two binding sites are used to bind the biotinylated lipid molecules and two binding sites are left available in the subphase. With compression completed, an ordered film containing both photodynamic substances and electrically-conductive substances is produced. This film may then be removed from the subphase and processed into desired multilayers or assemblies for use in creating biosensors, spatial modulators, solar collectors, color displays, camouflage systems, optoelectronic switching devices and the like.

Notwithstanding the fact that, in the process described above, the conjugated molecules are added to the subphase before compression of the air-subphase interface is initiated, it should be understood that the conjugated molecules also may be added to the subphase during or after compression of the interface.

Examples of suitable electrically-conductive lipids for use in the present invention include the polypyrroles, the polythiophenes, and the polyanilines. The relative proportions of biotinylated lipids and electrically conductive lipids to the total number of molecules in the monolayer may be varied; however, it is believed that only about 10% of the monolayer must be made up of biotinylated lipids for there to be complete coverage underneath the monolayer by the conjugated molecules since the conjugated molecules are considerably larger than the molecules of the monolayer.

Examples of photodynamic proteinaceous substances for use in the present invention include bacteriorhodopsin, rhodopsin, chemiluminescence systems such as luciferase, and the phycobiliproteins. The phycobiliproteins are proteins which make up the antennae proteins for light harvesting microorganisms. These proteins are highly fluorescent (20% more than fluorescein) and have quantum yields as high as 0.9. Phycoerythrin, the outer most phycobiliprotein, has an unusually large Stoke's shift of 81 nm (495 nm excitation and 576 nm emission), which is more than 2.7 times that of fluorescein. As can readily be appreciated, it may be desirable in certain applications to use combinations of two or more different types of photodynamic proteins, the proteins differing, for example, in their excitation spectra.

At least three different types of conjugated molecules are envisioned by the present invention. In the first type of conjugated molecule, the photodynamic proteinaceous component is covalently bound to the biotin-binding component. In the second type of conjugated molecule, the biotin-binding component has at least one biotin-binding site on its underside which is used to bind a biotinylated derivative of the photodynamic proteinaceous component. As discussed above, this type of binding mechanism can be used to develop a cassette approach wherein various substances are derivatized with biotin and then allowed to bind interchangeably to biotin-binding molecules. Also as discussed above, the cassette approach could be used to bind successive layers of conjugated molecules using biotinylated rigid or flexible coupler molecules.

In a third type of conjugated molecule, the genes which code for the photodynamic proteinaceous component and the biotin-binding component are recombined and then expressed to produce a genetically-engineered fusion protein. Streptavidin-containing fusion proteins are described at page 516 in the Abstract Book of the 10th International Biophysics Congress, Vancouver, B.C. August 1990) and by T. Sano et al., Proc. Natl. Acad. Sci. USA, Vol. 87, pp. 142-146 (1990), both of which are incorporated herein by reference.

Additional mechanical stability may be imparted to the Langmuir-Blodgett films of the present invention by polymerizing all or a portion of the monolayer. This may be achieved, for example, by selecting biotinylated lipids that include a polymerizable component, such as a diacetylene or vinyl group (which will polymerize upon heating or irradiation), or by forming a monolayer which includes polymerizable elements in addition to biotinylated lipids.

One preferred method of making the Langmuir-Blodgett film having photo-electronic properties comprises the following steps:

a) A plurality of water-immiscible molecules is spread over a water-miscible solvent subphase having an air-subphase interface, the water-immiscible molecules comprising a mixture of one or more types of biotinylated lipid molecules and one or more types of electrically-conductive lipid molecules.

b) One or more types of biotin-binding molecules are introduced into the subphase, each of the one or more types of biotin-binding molecules comprising a first group of one or more biotin-binding sites adapted for binding the one or more types of biotinylated lipid molecules and a second group of one or more biotin-binding sites adapted for binding either biotinylated photodynamic proteinaceous molecules or biotinylated coupler molecules, whereby the one or more types of biotin-binding molecules become bound to the one or more types of biotinylated lipid molecules through the first group of one or more biotin-binding sites.

c) A mixture of one or more types of biotinylated photodynamic proteinaceous molecules and one or more types of biotinylated coupler molecules are introduced into the subphase whereby the one or more types of biotinylated photodynamic proteinaceous molecules and the one or more types of biotinylated coupler molecules become bound to the biotin-binding molecules through the second group of one or more biotin-binding sites.

d) One or more types of biotin-binding molecules are then introduced into the subphase, each of the one or more types of biotin-binding molecules in the second group comprising a first group of one or more biotin-binding sites adapted for binding the one or more types of biotinylated coupler molecules and a second group of one or more biotin-binding sites adapted for binding either biotinylated photodynamic proteinaceous molecules or biotinylated coupler molecules.

e) An additional group of one or more types of biotinylated photodynamic proteinaceous molecules are then introduced into the subphase whereby the additional group of one or more biotinylated photodynamic proteinaceous molecules become bound to the biotin-binding molecules through the second group of one or more biotin-binding sites.

f) Lastly, the air-subphase interphase is then compressed so as to form an ordered monolayer having photoelectronic properties thereat.

The method disclosed above may be modified by introducing, after step (d) and before step (f), the step of introducing into the subphase an additional group of one or more biotinylated coupler molecules, and then repeating steps (d) and (e).

The following examples further illustrate preferred embodiments of the present invention. The examples should in no way be taken as limiting, but rather, should be considered to be illustrative of the various features of the present invention.

EXAMPLE 1

To establish the adsorption of avidin-phycoerythrin and streptavidin-phycoerythrin conjugates to monolayer films made up of the biotinylated phospholipid, N-(biotinoyl)dipalmitoyl-L-alphaphosphatidylethanolamine, triethylammonium salt (B-DPPE), four pressure-area isotherm measurements were taken. These measurements were carried out on Lauda MGW Filmwaag troughs with a surface area of approximately 930 cm$^2$. The subphase used for the four experiments was composed of an aqueous solution of 0.1 mM sodium phosphate, 0.1M NaCl, in highly purified Milli-Q water (Millipore Co. Ltd.) at pH 6.8. In each of the four experiments, a 0.5 mM chloroform solution of B-DPPE (Molecular Probes Co. of Eugene, Oreg.) was spread over the air-subphase interface. In addition, in three of the four experiments, a 0.1 mg aliquot of either phycoerythrin, avidin-phycoerythrin, or streptavidin-phycoerythrin (Biomeda Corporation of Foster City, Calif.) in 5 ml of the buffered subphase was injected into the subphase and left to incubate for 2 hours at 30 degrees C. In the fourth experiment, no protein was injected into the subphase. Compression of the interface was carried out at a speed of approximately 2 mm$^2$/min until collapse of the film was observed. The resulting isotherms are shown in FIG. 3.

Figure 3:
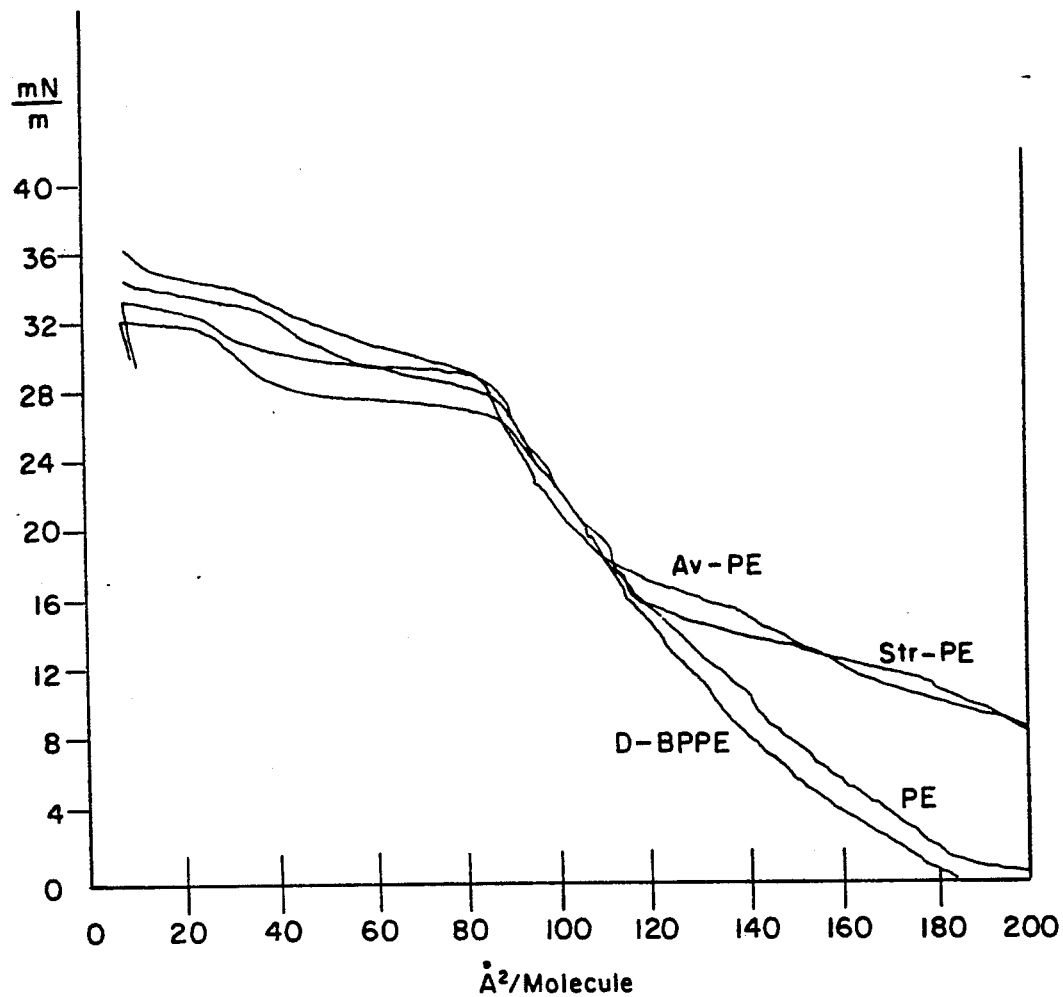
FIG. 3 is a composite of the isotherms obtained in Example 1.

As can be observed from FIG. 3, all of the isotherms displayed a relatively steep slope after a pressure of 15 mN/m, which corresponds to an area per molecule of approximately 100 A$^2$. However, the isotherms corresponding to the avidin-phycoerythrin (Av-PE) and streptavidin-phycoerythrin (Str-PE) experiments are significantly different in the expanded states. Moreover, a significant increase in surface pressure was observed with these experiments at larger areas per molecule. This behavior suggests that the conjugated protein systems are in some way incorporating themselves into the biotinylated monolayer in the expanded state. Then, as compression is continued, the protein injected monolayers reach a stage where they actually overlap the pure B-DPPE isotherm. This overlapping may be explained by the bulkiness of the phycoerythrin protein which is attached to the avidin and streptavidin tetramers. Phycoerythrin is known to be disc-shaped with dimensions of approximately 60 A by 120 A and a molecular weight of 240,000 daltons. This additional size and weight may be sufficient to cause a "swinging down" of the conjugated proteins into the aqueous subphase during monolayer compression. If this "swinging down" is occurring, one would expect to see an increase in surface pressure in the expanded state and an overlapping of the isotherm with the pure lipid upon further compression as the protein re-orients itself down in the subphase. This behavior is evidence that the conjugated proteins are adsorbing by binding to biotin moieties on the B-DPPE.

In contrast to the isotherms corresponding to the Av-PE and Str-PE injected monolayers, the isotherm corresponding to the unconjugated phycoerythrin (PE) injected monolayer displayed very little change as compared to the isothers corresponding to the pure B-DPPE monolayer. Since the phycoerythrin does not have any tetramer protein bound to it, this further supports that the biotin binding sites of the avidin and streptavidin tetramer proteins are responsible for adsorption.

EXAMPLE 2

To establish whether adsorption occurs through an entirely specific mechanism (i.e., biotin-avidin or biotin-streptavidin) or through a combination of both specific and non-specific binding mechanisms, the following fluorescence measurements of various LB films were taken. In these measurements, excitation of the films was achieved with 496 nm light from an Argon Ion laser; emission was measured in the range from 515 to 670 nm. The LB film described below were obtained essentially in the manner described above in Example 1, except that the films were compressed to an annealing surface pressure of approximately 15 mN/m for deposition. The films were then transferred onto glass solid supports for fluorescence spectroscopy.

Figure 4:
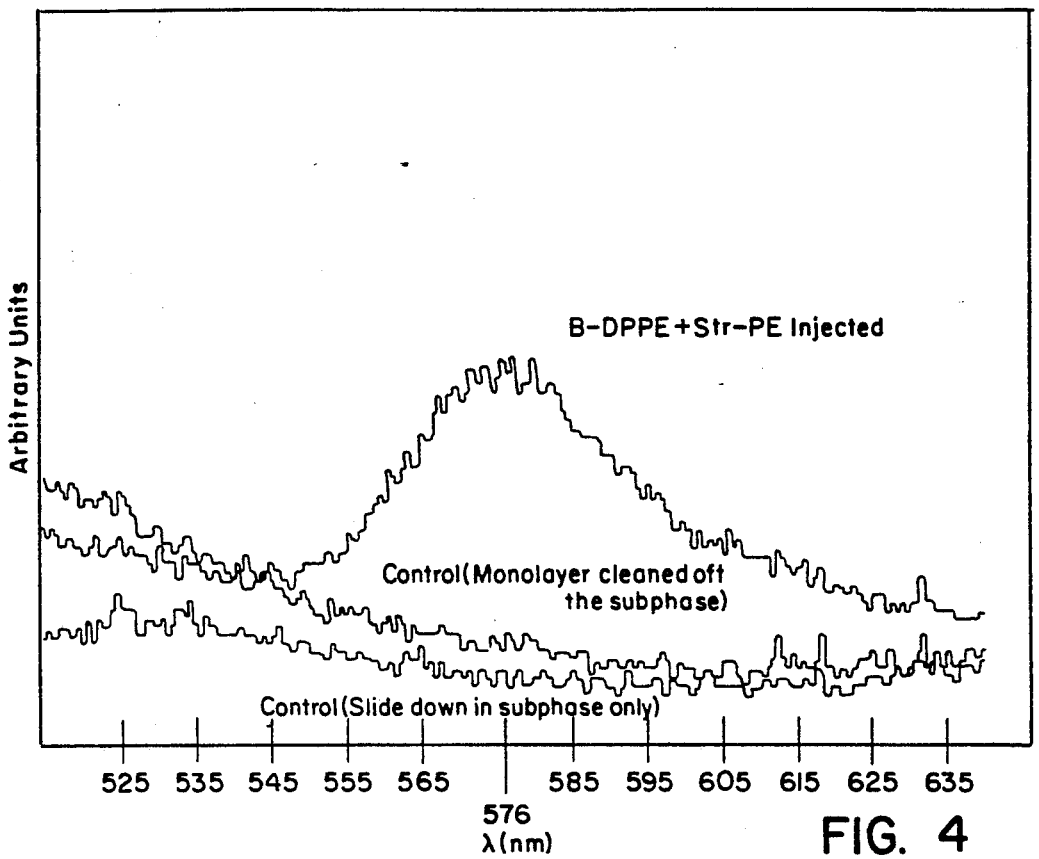
FIGS. 4 through 7 are the fluorescence spectra obtained in Example 2.

FIG. 4 shows the fluorescence spectra for a Str-PE injected B-DPPE monolayer film and for two controls. The controls were obtained by vertically passing glass slides into the protein-containing subphase after removal of the monolayer therefrom. The controls demonstrate that the conjugated proteins do not spontaneously adsorb onto the bare, clean, glass surface. As shown, the Str-PE injected B-DPPE monolayer gives a strong emission at approximately 576 nm, which corresponds to the emission of the native aqueous phycoerythrin conjugated protein. The two controls shown no emission in this region, evincing that the Str-PE has adsorbed to the biotinylated monolayer film.

Figure 5:
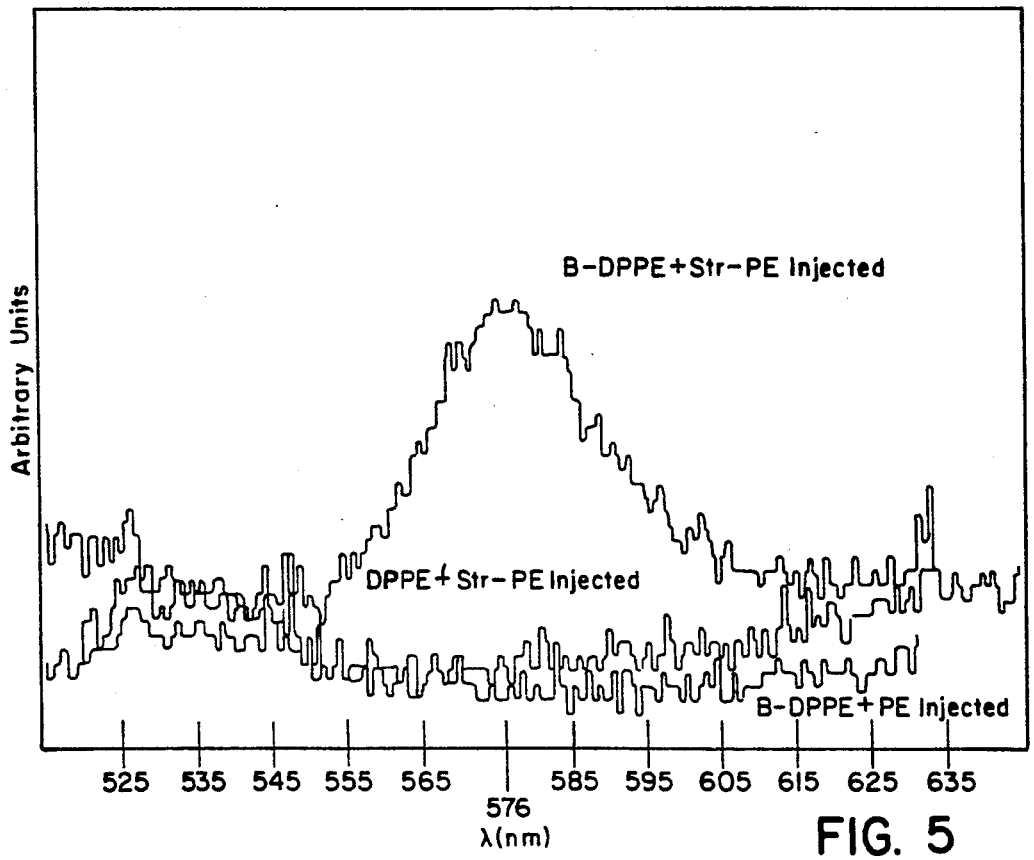

This raised the question of whether the biotin-streptavidin complex was responsible for the protein adsorption. To address this issue, two additional controls were investigated. The first included injecting unconjugated PE into the subphase of a B-DPPE monolayer. The second control involved preparing an unbiotinylated phospholipid monolayer (DPPE, which was obtained from Avanti Polar Lipids of Pelham, Ala.) and then injecting Str-PE into the subphase below it. FIG. 5 shows the fluorescence spectra for the Str-PE injected B-DPPE monolayer and the two controls described above. As can be seen, the Str-PE exposed biotinylated monolayer exhibits the characteristic native phycoerythrin emission at 576 nm whereas the two controls show no fluorescence signal. These results strongly suggest that both the streptavidin protein and the biotin functionalities are required for binding of phycoerythrin to the monolayer by complex formation.

Figure 6:
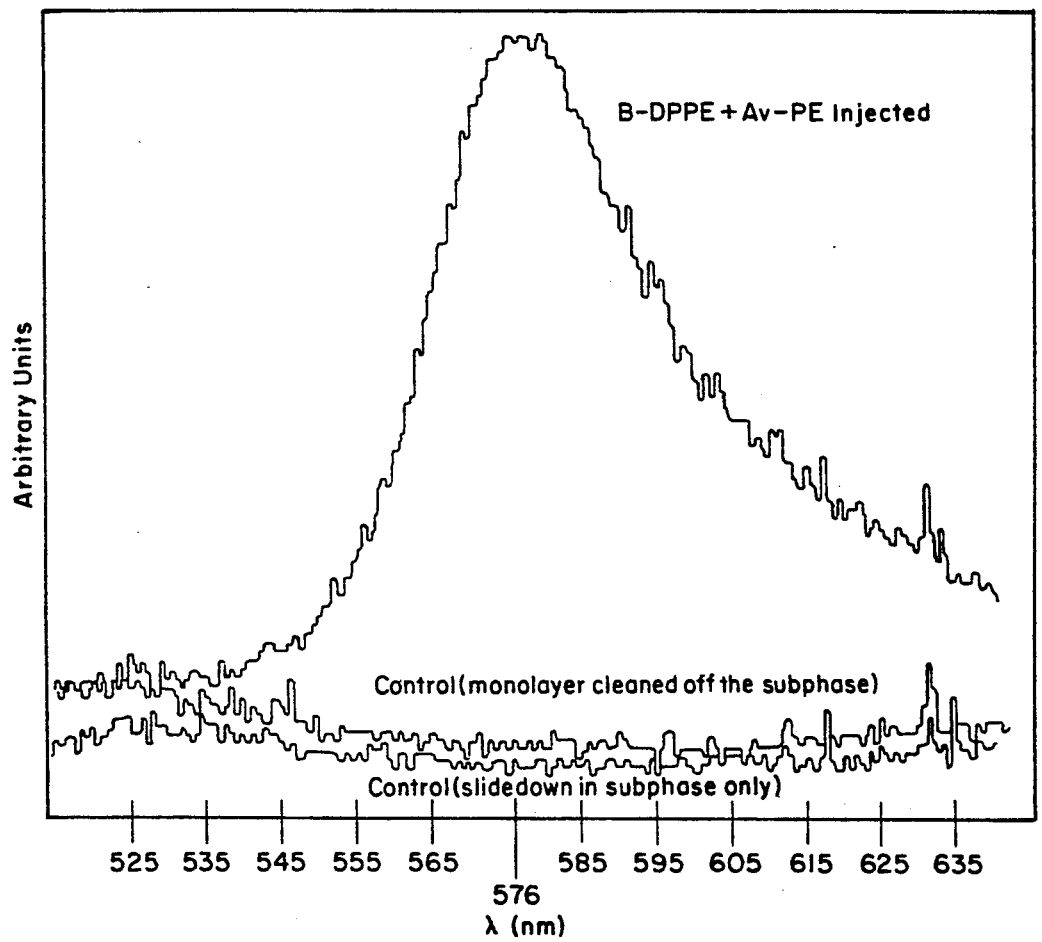

Similar experiments were performed with respect to the Av-PE conjugated protein system. As seen in FIG. 6, the Av-PE injected monolayer film gives a strong emission at 576 nm whereas the two controls give no corresponding emission. This again indicates biotin-avidin based adsorption of the native phycoerythrin protein to the monolayer.

Figure 7:
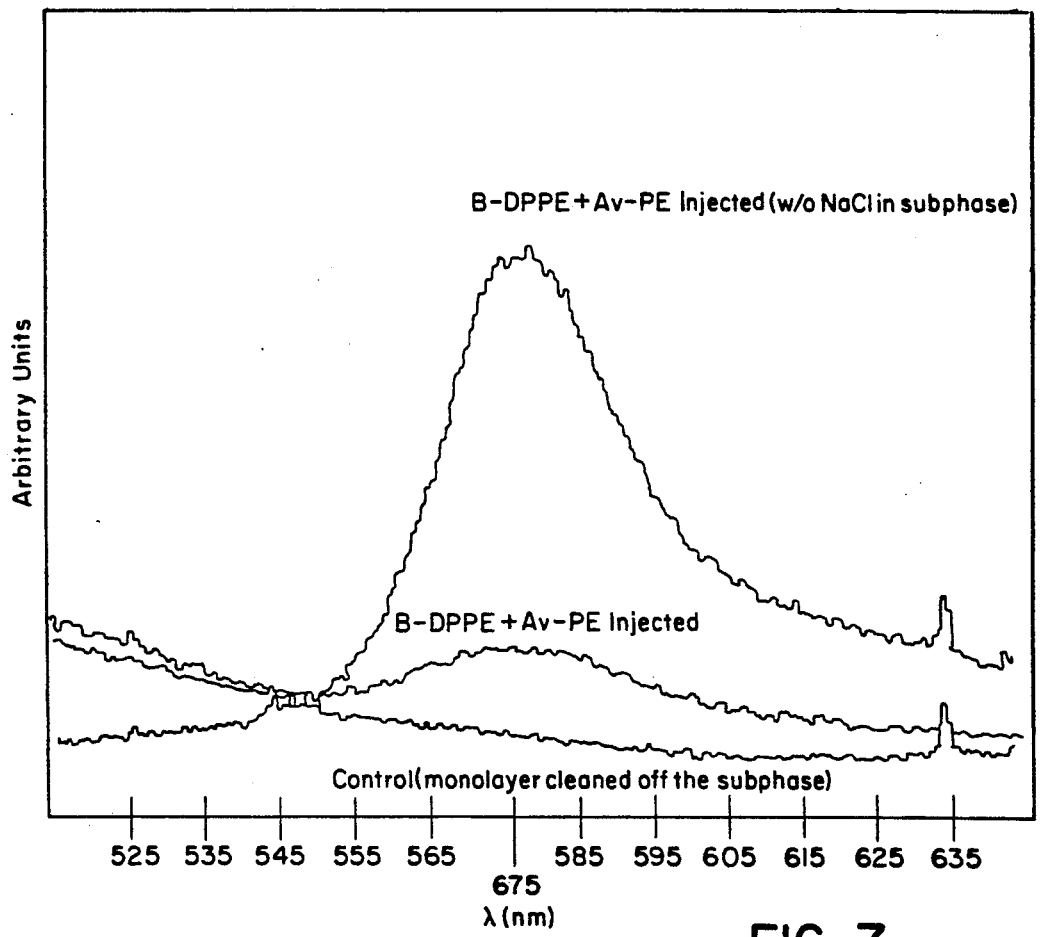

A direct comparison of the fluorescence emissions from the B-DPPE monolayers injected with Av-PE, Str-PE, and PE can be made from FIGS. 5 and 6. As can be seen, the emission of Av-PE is observed to be considerably stronger than that of Str-PE. This difference in the emissions suggests both specific and non-specific binding in the case of Av-PE. There are two possible mechanisms for non-specific avidin adsorption. First, avidin is post translationally modified by surface carbohydrate residues and will complex to the biotin lipid monolayer by both specific binding sites and non-specific binding mechanisms (e.g. electrostatic mechanisms). Evidence that Av-PE binds by an electrostatic, non-specific mechanism was obtained by observing how Av-PE complexed with the monolayer with and without NaCl in the aqueous subphase. The results of this experiment are shown in FIG. 7. As can be seen in FIG. 7, the decrease in emission intensity at 576 nm for the complexation run in the subphase with NaCl is evidence that charge-charge interactions to the non-specific adsorption of avidin is occurring and may be decreased by the addition of NaCl.

EXAMPLE 3

Figure 8:
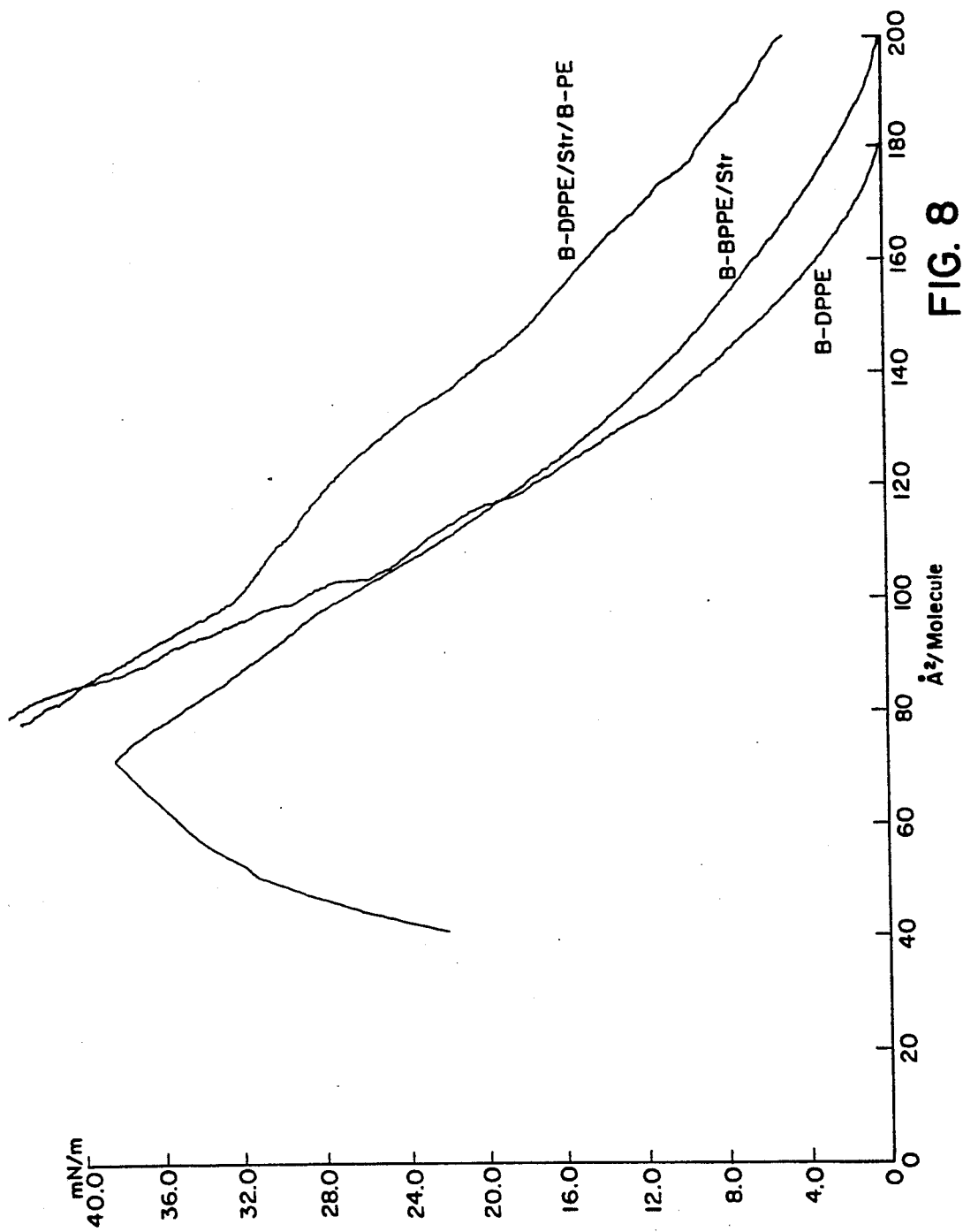
FIG. 8 is a composite of the isotherms obtained in Example 3.
Figure 9A:
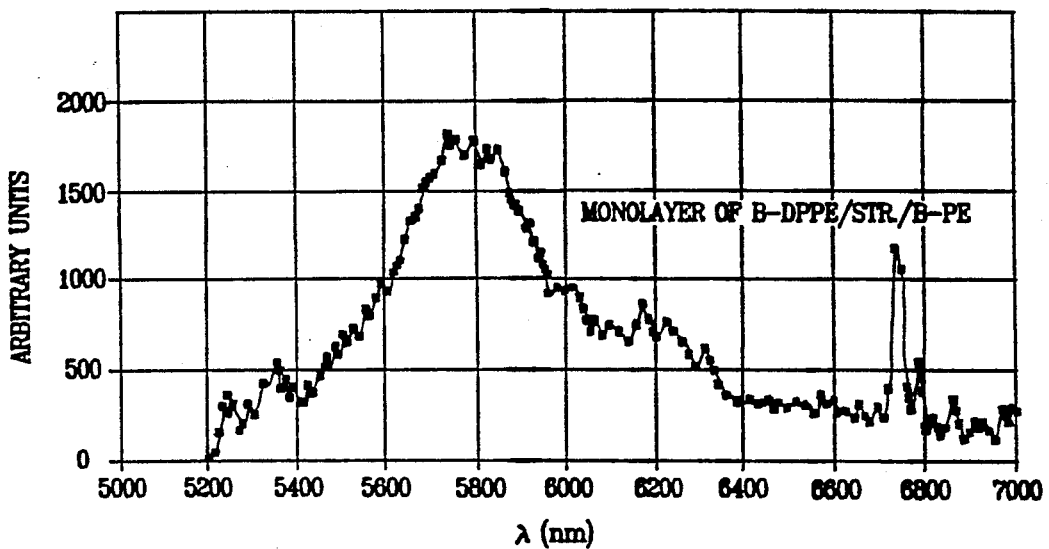
FIGS. 9(a) and 9(b) are the fluorescence spectra obtained in Example 3.
Figure 9B:
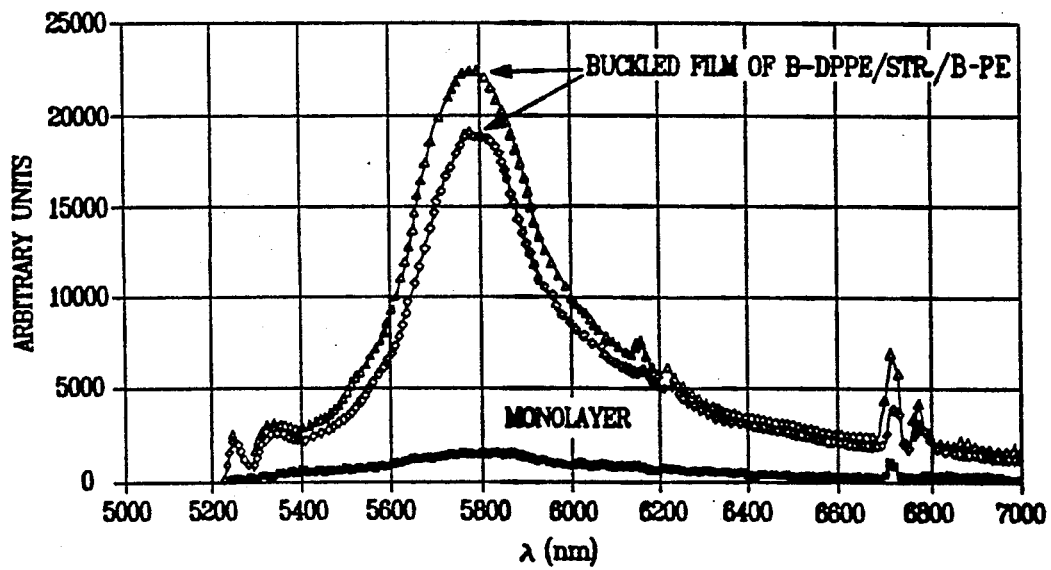

Streptavidin alone was absorbed onto a monolayer consisting of biotinylated lipid. Then, biotinylated phycoerythrin was injected into the subphase and allowed to react with the biotinylated lipid-streptavidin complex previously formed. FIG. 8 is a composite of isotherms obtained at various times during the above-described process. The continuous expansion of the monolayer during the equilibrium indicates that the biotinylated phycoerythrin is incorporating itself into the monolayer assembly as expected. FIG. 9(a) is a fluorescence spectrum for the above-described monolayer. The emission peak at 576 nm is a signature of the bound phycoerythrin protein. FIG. 9(b) compares the emission from the monolayer of FIG. 9(a) to a collapsed or buckled film. As can be seen, the buckled film gives a considerably stronger emission than the monolayer since there is more of the monolayer present in the buckled film. These results show that the phycoerythrin is bound to the monolayer and demonstrate the feasibility of a cassette approach.

EXAMPLE 4

Figure 10:
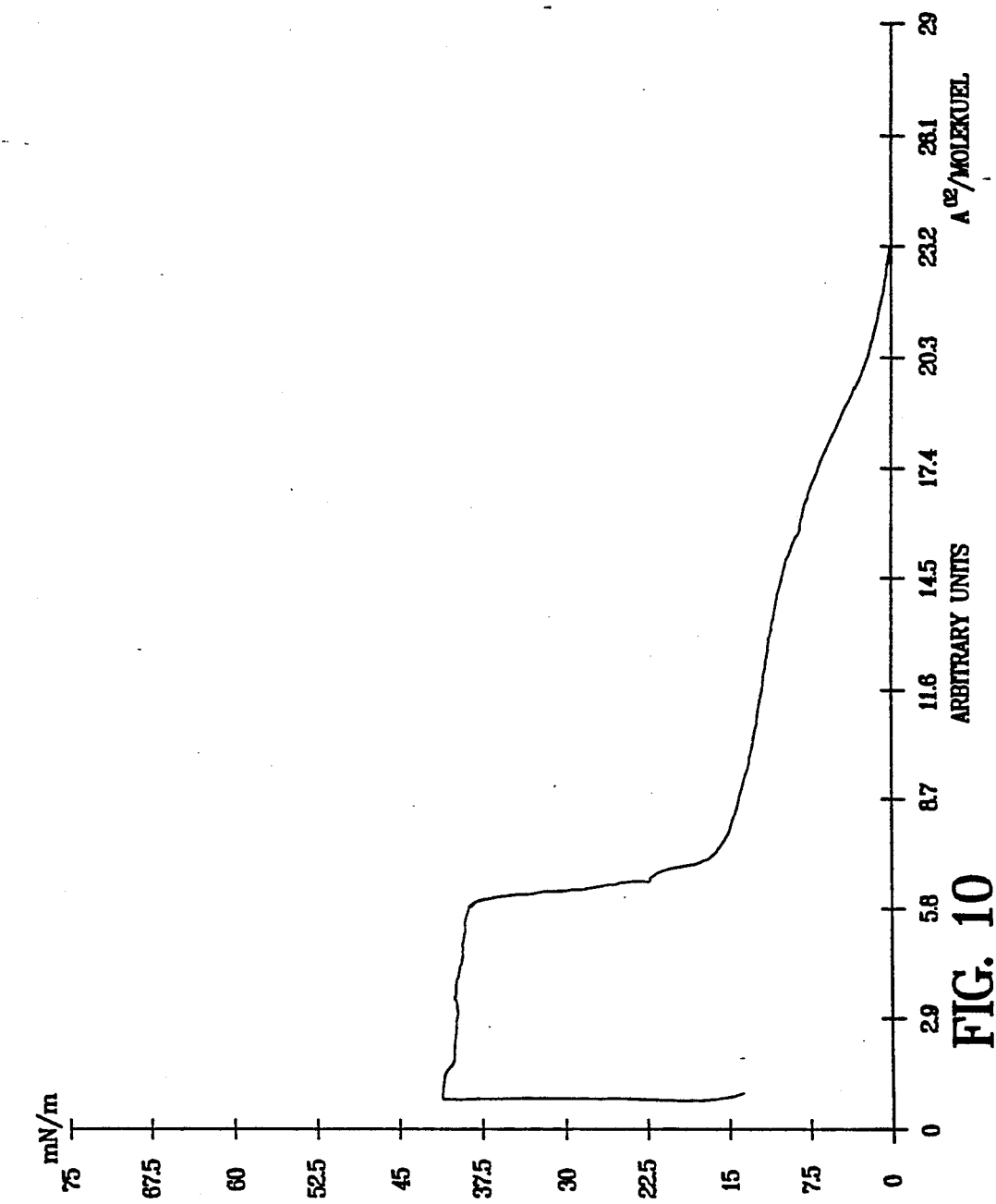
FIG. 10 is the isotherm obtained in Example 4.

A monolayer made up of polyoctylthiophene and B-DPPE was formed as seen by the isotherm of FIG. 10. This isotherm demonstrates the feasibility of making monolayers comprising a mixture of electrically conducting lipids and biotinylated lipids.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:
1. A method for preparing a Langmuir-Blodgett film having photo-electronic properties comprising the steps of:
   a) spreading a plurality of water-immiscible molecules over a water-miscible solvent subphase having an air-subphase interface, said water-immiscible molecules including a mixture of one or more types of biotinylated lipid molecules and one or more types of electrically-conductive lipid molecules;

b) introducing into said subphase one or more types of conjugated molecules, each of said conjugated molecules comprising a photodynamic proteinaceous component and a biotin-binding component, whereby said biotin-binding components become bound to said one or more types of biotinylated lipid molecules; and c) compressing said air-subphase interface so as to form an ordered monolayer having photo electronic properties thereat.

2. The method as claimed in claim 1 wherein said introducing step is initiated during said compressing step.

3. The method as claimed in claim 1 wherein said introducing step is initiated before said compressing step.

4. The method as claimed in claim 1 wherein said introducing step is initiated after said compressing step.

5. The method as claimed in claim 1 wherein said biotin-binding components are either identical or different and are selected from the group consisting of avidin, streptavidin, and a fragment or derivative of avidin or streptavidin having biotin-binding activity.

6. The method as claimed in claim 1 wherein said photodynamic proteinaceous components are either identical or different and are selected from the group consisting of bacteriorhodopsin, rhodopsin, luciferase, the phycobiliproteins and a fragment or derivative of bacteriorhodopsin, rhodopsin, luciferase or the phycobiliproteins having photodynamic activity.

7. The method as claimed in claim 1 wherein said photodynamic proteinaceous components are phycoerythrin molecules.

8. The method as claimed in claim 1 wherein said one or more types of electrically-conductive lipid molecules are either identical or different and are selected from the group consisting of polypyrrole, polythiophene, and polyaniline.

9. The method as claimed in claim 1 wherein at least a portion of said one or more types of biotinylated lipid molecules are polymerizable with heat or irradiation, said method further comprising, after said compressing step, the step of heating or irradiating said polymerizable biotinylated lipid molecules so as to cause their polymerization.

10. The method as claimed in claim 1 wherein, in at least a portion of said one or more types of conjugated molecules, said photodynamic proteinaceous component is covalently bound to said biotin-binding component.

11. The method as claimed in claim 10 wherein said biotin-binding component is selected from the group consisting of avidin, streptavidin, or a fragment or derivative thereof having biotin-binding activity and wherein said photodynamic proteinaceous component and said biotin-binding component together form a fusion protein made by a recombinant DNA technique.

12. The method as claimed in claim 1 wherein said one or more types of biotinylated lipid molecules constitute about 10% of said plurality of water-immiscible molecules.

13. The method as claimed in claim 12 wherein said one or more types of electrically-conductive lipid molecules constitute about 90% of said plurality of water-immiscible molecules.

14. A method for preparing a Langmuir-Blodgett film having photo-electronic properties comprising the steps of:

a) spreading a plurality of water-immiscible molecules over a water-miscible solvent subphase having an air-subphase interface, said water-immiscible molecules comprising a mixture of one or more types of biotinylated lipid molecules and one or more types of electrically-conductive lipid molecules;

b) introducing into said subphase one or more types of conjugated molecules, each of said one or more types of conjugated molecules comprising one or more types of biotinylated photodynamic proteinaceous components and a biotin-binding component, said biotin-binding component comprising a first group of one or more biotin-binding sites adapted for binding said one or more types of biotinylated lipid molecules and a second group of one or more biotin-binding sites for binding said one or more types of biotinylated photodynamic proteinaceous components, whereby said biotin-binding components become bound to said one or more types of biotinylated lipid molecules through said first group of one or more biotin-binding sites; and c) compressing said air-subphase interface so as to form an ordered monolayer having photo-electronic properties thereat.

15. A method for preparing a Langmuir-Blodgett film having photo-electronic properties comprising the steps of:

a) spreading a plurality of water-immiscible molecules over a water-miscible solvent subphase having an air-subphase interface, said water-immiscible molecules comprising a mixture of one or more types of biotinylated lipid molecules and one or more types of electrically-conductive lipid molecules;

b) introducing into said subphase one or more types of biotin-binding molecules, each of said one or more types of biotin-binding molecules comprising a first group of one or more biotin-binding sites adapted for binding said one or more types of biotinylated lipid molecules and a second group of one or more biotin-binding sites adapted for binding either biotinylated photodynamic proteinaceous molecules or biotinylated coupler molecules, whereby said one or more types of biotin-binding molecules become bound to said one or more types of biotinylated lipid molecules through said first group of one or more biotin-binding sites;

c) introducing into said subphase a mixture of one or more types of biotinylated photodynamic proteinaceous molecules and one or more types of biotinylated coupler molecules, whereby said one or more types of biotinylated photodynamic proteinaceous molecules and said one or more types of biotinylated coupler molecules become bound to said biotin-binding molecules through said second group of one or more biotin-binding sites;

d) introducing into said subphase one or more types of biotin-binding molecules, each of said one or more types of biotin-binding molecules in said second group comprising a first group of one or more biotin-binding sites adapted for binding said one or more types of biotinylated coupler molecules and a second group of one or more biotin-binding sites adapted for binding either biotinylated photodynamic proteinaceous molecules or biotinylated coupler molecules;

e) introducing into said subphase an additional group of one or more types of biotinylated photodynamic proteinaceous molecules, whereby said additional group of one or more biotinylated photodynamic proteinaceous molecules become bound to said biotin-binding molecules through said second group of one or more biotin-binding sites; and f) compressing the air-subphase interface so as to form an ordered monolayer having photo-electronic properties thereat.

16. The method as claimed in claim 15 further comprising after step (d) and before step (f), the step of introducing into said subphase an additional group of one or more biotinylated coupler molecules, then repeating steps (d) and (e).

* * * * *